Aug. 13, 1929.                F. M. REID                1,724,364
                           SIDE DUMP VEHICLE
                    Filed Oct. 15, 1927        2 Sheets-Sheet 2

INVENTOR.
Frederick M. Reid
BY
ATTORNEY.

Patented Aug. 13, 1929.

1,724,364

UNITED STATES PATENT OFFICE.

FREDERICK M. REID, OF DETROIT, MICHIGAN, ASSIGNOR TO FRUEHAUF TRAILER COMPANY, OF DETROIT, MICHIGAN, A CORPORATION OF MICHIGAN.

SIDE-DUMP VEHICLE.

Application filed October 15, 1927. Serial No. 226,307.

This invention relates to a side dump vehicle, with special reference to a construction for holding the body upright in load supporting position and which readily permits movement of the body to either side to discharge a load.

The construction takes the form of a locking device which is releasable to permit the body to be moved to one side or the other. This locking device acts to stop the body when it is moved back to vertical or load supporting position, and it is arranged to absorb the shock in stopping this back movement. When the device is in fully locked position for operation of the vehicle, the device acts to cushion the body against sidewise movements, or in other words against rocking of the vehicle body from side to side.

Figure 1:
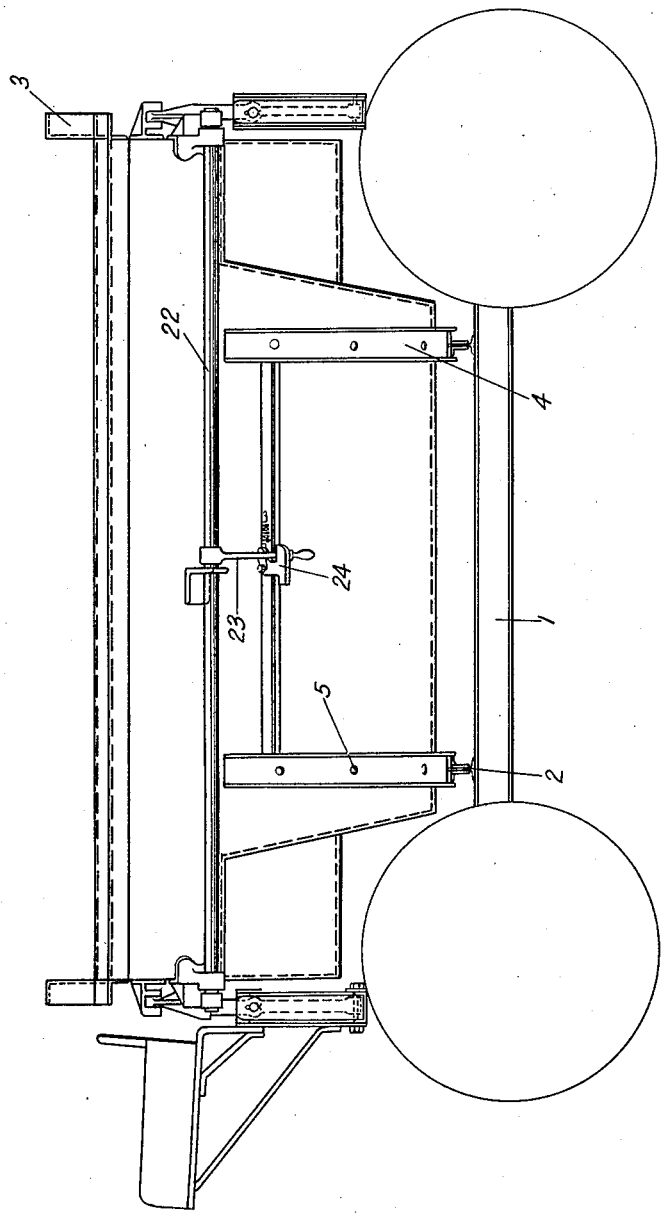
Fig. 1 is a side elevation of a vehicle which embodies the locking construction of the invention.

In the drawings, a vehicle is shown which is in the form of a trailer adapted to be put into a train of trailers and drawn by a tractor, or to be drawn individually by horses, such vehicles being useful in the collection of refuse. The chassis of the vehicle includes a frame 1 with cross members 2, which support a load carrying body 3. The body includes arcuate channel members 4 which ride on the transverse members 2, and these arcuate members may be provided with holes 5 adapted to fit over projections 6 of the transverse members.

Figure 2:
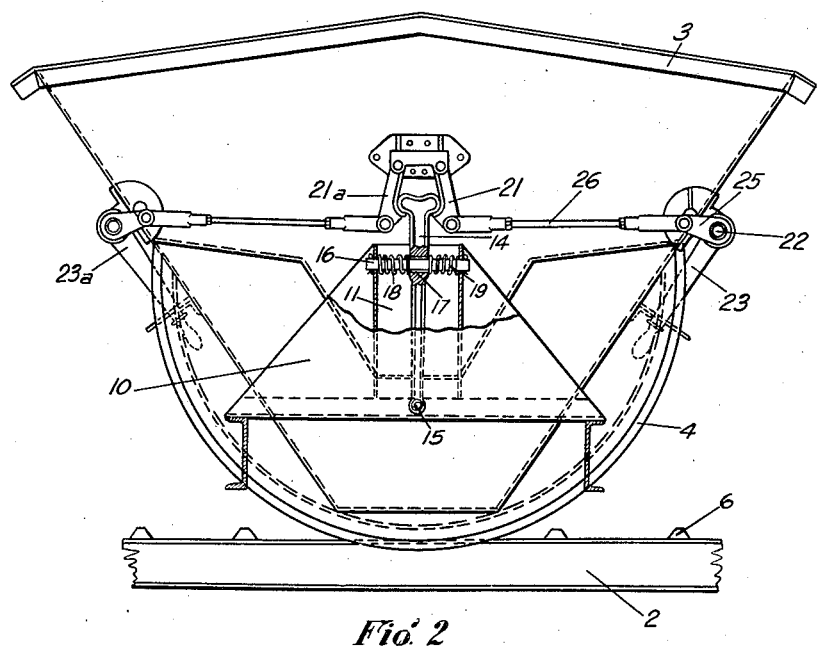
Fig. 2 is an end view of the side dump body, showing the locking construction, with some of the parts thereof shown in section.

This body can be rolled to either side for the purpose of discharging a load, and it is held in an upright position, as shown in Fig. 2, while in use. At each end of the vehicle there is a fixed frame construction 10 arranged to provide a channel formation 11 bounded by opposed walls 12 and 13. These walls may be provided by flanges on sheet steel members which are utilized in the frame construction. A member 14 in the nature of a stop is pivoted to the frame of the vehicle, as at 15, and extends up through the channel 11. A bolt or rod 16 extends through holes provided therefor in the flanges 12 and 13, and through a hole 17 in the stop member. Opposed springs 18 and 19 are disposed between opposite sides of the stop and the adjacent flange, and the bolt 16 may be held in place by suitable keys or pins 20. The stop member can thus pivot, and in doing so compresses one of the springs, the hole 17 being of such size as to accommodate for the arc of movement, and the two springs serve normally to hold the stop member centrally and in an upright position.

This stop member works in conjunction with latch devices on the body. There is such a stop member at each end of the vehicle, and the trailer body carries latch devices at each end for cooperation with the two stop members. These latch devices take the form of pivoted hooks 21 and 21ª which engage opposite sides of the stop. The hook 21 is controlled by means of a rock shaft 22 which extends the length of the body and which is provided with an operating handle 23 disposed approximately centrally of the vehicle. A suitable spring pressed catch 24 is used to hold a handle in locked position. At each end of the vehicle the rock shaft 22 is provided with an arm 25 each of which is connected to a hook 21 by a rod 26. It will be understood that the hooks 21ª are operated by a similar handle 23ª and a rock shaft and connections at the opposite side of the body.

Figure 3:
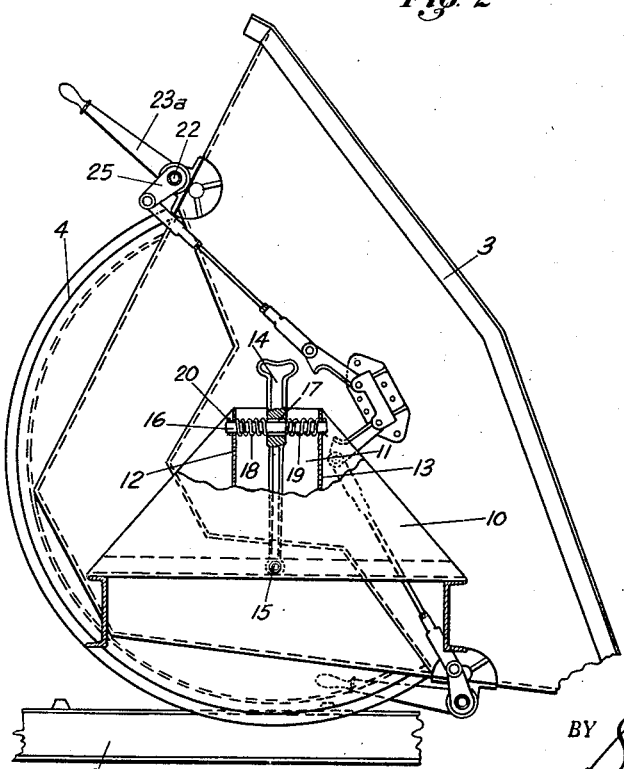
Fig. 3 is a view similar to Fig. 2 but showing the body in substantially side dumping position.

When the vehicle is in use, either empty or loaded, and when the body is in position shown in Fig. 2, it is held upright by reason of the hooks 21 and 21ª engaging with the stop members. Both ends of the body are thus locked. It will be noted that sidewise rocking movement of the body is thus prevented and this movement is cushioned by the springs disposed on either side of the stop member. When it is desired to discharge the contents of the body, an operator goes to the side of the vehicle and raises the lever at that side of the vehicle. Assuming that this lever is the one referenced 23ª, the rock shaft upon which it is mounted, through the connections shown, raises both the hooks 21ª at opposite ends of the body, whereupon the body may be permitted to roll to the position of Fig. 3, or pushed over if it does not roll of its own accord. Of course, if it is desirable to dump to the other side of the vehicle the operator will go to the opposite side and loosen the lever 23. After the contents have been discharged, the body may be pulled back into place, and when it assumes an upright position the hooks 21 strike the stop members, and the opposed springs on the stop members again come into play and cushion the stopping action. The lever 23ᵃ is now brought back to the position shown in Fig. 2 and held there by its latch, so that the body is once again held upright by the hooks 21 and 21ᵃ engaging opposite sides of the stops.

Side dump vehicles of the type here depicted have been proposed heretofore, but various binders and chains have been utilized for holding the bodies in position. The present invention simplifies the construction and facilitates the dumping operation, inasmuch as the only operation required is the actuation of one of the handles. Thus, it not only represents a saving of time, but also provides a compact locking mechanism which resiliently supports the body in operating position.

Claims:

1. In a side dump vehicle, the combination of a vehicle frame, a body supported by the frame and arranged to dump to either side of the frame, end portions on the frame which lie adjacent the ends of the body, and means for locking the body and end portions including a stop member on one of the parts, a pair of independently releasable devices on the other part which engage opposite sides of the stop member, and a spring mounting for the stop member adapted to cushion sidewise movements of the body.

2. In a side dump vehicle, the combination of a vehicle frame, a body adapted to dump to either side of the vehicle, a stop member fixed to the frame near each end thereof, a pair of latch devices on each end of the body which engage opposite sides of the stop members, and means operable to simultaneously release one latch member on each end of the body to disengage the stop members and permit side dumping of the body, said means being disposed substantially centrally of the length of the vehicle and at one side of the body.

3. In a side dump vehicle, the combination of a vehicle frame, a body adapted to dump to either side thereof, a stop member fixed to the frame at each end thereof, a pair of movable latch devices on each end of the body which engage opposite sides of the stop members to hold the body in upright operating position, cushioning springs in which the stop members are mounted to absorb side shocks, means for substantially simultaneously releasing one latch member at each end of the body and permitting the other latch members at each end of the body to remain in contact with the stop members so that the body can be dumped to one side, the unmoved latch members being adapted to abut against the stops when the body is returned to upright operating position.

4. In a side dump vehicle, the combination of a vehicle frame, a body adapted to dump to either side thereof, a stop member fixed to the vehicle frame at each end thereof, a pair of movable latch devices on each end of the body which engage opposite sides of the stop member to hold the body in upright operating position, cushioning springs in which the stop members are mounted to absorb side shocks, means for substantially simultaneously releasing one latch member at each end of the body and permitting the other latch member at each end of the body to remain in contact with the stop members so that the body can be dumped to one side, the unmoved latch members being adapted to abut against the stops when the body is returned to upright operating position, and said cushioning springs acting on the stop members to absorb the shock when the body is returned to operating position.

5. In a side dump vehicle, the combination of a vehicle frame, a body adapted to dump to either side thereof, an upright stop member pivoted to the vehicle frame near one end, opposed springs acting on this stop member arranged to permit pivotal movement of the stop member under the action of the springs, and a pair of latch devices on the vehicle body which engage opposite sides of the stop member, said latch devices being releasable to permit dumping of the body.

6. In a side dump vehicle, the combination of a vehicle frame, a body adapted to dump to either side thereof, a stop member fixed to the vehicle frame near each end, a pair of pivoted latch devices on each end of the body which engage the stop members to hold the body in upright position, a rock shaft extending along each side of the body, an operable connection between the ends of the rock shafts and one of the latch devices at each end of the body, and means for independently actuating the rock shafts to release the latches operably connected thereto.

7. The combination with a vehicle having a body adapted to dump to either side thereof, a stop member fixed to the vehicle frame near each end, a pair of pivoted latch devices on each end of the body which engage the stop members to hold the body in upright position, a rock shaft extending along each side of the body, an operable connection between the ends of the rock shafts and one of the latch devices at each end of the body, and an operating handle on each rock shaft for rocking the shaft to release the latches to which the same is connected.

8. The combination with a vehicle having a body adapted to dump to either side thereof, a stop member fixed to the vehicle frame near each end, a pair of pivoted latch devices on each end of the body which engage the stop members to hold the body in upright position, a rock shaft extending along each side of the body, an operable connection between the ends of the rock shafts and one of the latch devices at each end of the body, means for independently actuating the rock shafts to release the latches operably connected thereto, and means for locking the latch device in stop engaging position.

9. The combination with a vehicle having a body adapted to dump to either side thereof, a stop member fixed to each end of the vehicle frame which is mounted in springs to permit side movement of the stops under spring action, a pair of latch devices pivoted to each end of the body which engage opposite sides of the stops to hold the body upright, a rock shaft extending along each side of the body, an operable connection between the ends of the rock shaft and one of the pivoted latch members at each end of the body, an operating handle on each rock shaft whereby the rock shafts may be independently rocked to release the two latches connected thereto and permit side dump of the body with the remaining two latches held in stop engaging position, and which are adapted to abut against the spring mounted stops when the body is swung back to operating position.

In testimony whereof I affix my signature.

FREDERICK M. REID.